US012800057B2

(12) United States Patent
Wenzel

(10) Patent No.: US 12,800,057 B2
(45) Date of Patent: Nov. 17, 2026

(54) VALVE DEVICE

(71) Applicant: Illinois Tool Works Inc., Glenview, IL (US)

(72) Inventor: Daniel Wenzel, Wipperfürth (DE)

(73) Assignee: Illinois Tool Works Inc., Glenview, IL (US)

( * ) Notice: Subject to any disclaimer, the term of this patent is extended or adjusted under 35 U.S.C. 154(b) by 76 days.

(21) Appl. No.: 18/345,639

(22) Filed: Jun. 30, 2023

(65) Prior Publication Data

US 2024/0019043 A1 Jan. 18, 2024

(30) Foreign Application Priority Data

Jul. 13, 2022 (DE) ......................... 102022117525.1
Jun. 16, 2023 (DE) ......................... 102023115758.2

(51) Int. Cl.

*F16K 31/124* (2006.01)
*F01P 7/14* (2006.01)
*F16K 11/16* (2006.01)
*F16K 31/04* (2006.01)

(52) U.S. Cl.

CPC ...... *F16K 31/124* (2013.01); *F01P 2007/146* (2013.01); *F16K 11/165* (2013.01); *F16K 31/043* (2013.01)

(58) Field of Classification Search

CPC ................. F16K 11/165; F16K 11/166; Y10T 137/87724; Y10T 137/87732
See application file for complete search history.

(56) References Cited

U.S. PATENT DOCUMENTS 4,749,004 A * 6/1988 Peash ...................... F16K 11/22 137/865
8,887,761 B2 * 11/2014 Yokoyama ............. F02M 26/26 137/601.11
9,500,299 B2 * 11/2016 Morein ............... F16K 11/0876
9,903,257 B2 * 2/2018 Heldberg .................. F01P 7/14
2012/0291901 A1 * 11/2012 Holley .................. F16K 11/165 137/637.1
2015/0027575 A1 * 1/2015 Morein ................. F16K 11/165 137/865
2022/0082172 A1 * 3/2022 Güttinger ............... F01P 11/029
2026/0126224 A1 * 5/2026 Wong ...................... F16K 11/22

* cited by examiner

*Primary Examiner* — Robert K Arundale
(74) *Attorney, Agent, or Firm* — McAndrews, Held & Malloy, Ltd.

(57) ABSTRACT

A valve device is provided for controlling the flow of fluids, comprising an actuator device having first and second transmission/coupling devices and a servo drive, a first and a second closure body of a first and a second valve, wherein the first closure body is connected to the servo drive via the first transmission/coupling device, and the second closure body is connected to the servo drive via the second transmission/coupling device, and wherein the first transmission/coupling device and the second transmission/coupling device are configured in such a way that, upon rotation of the servo drive in a first direction, the first closure body is rotated by the servo drive while the second closure body is not rotated by the servo drive.

13 Claims, 1 Drawing Sheet

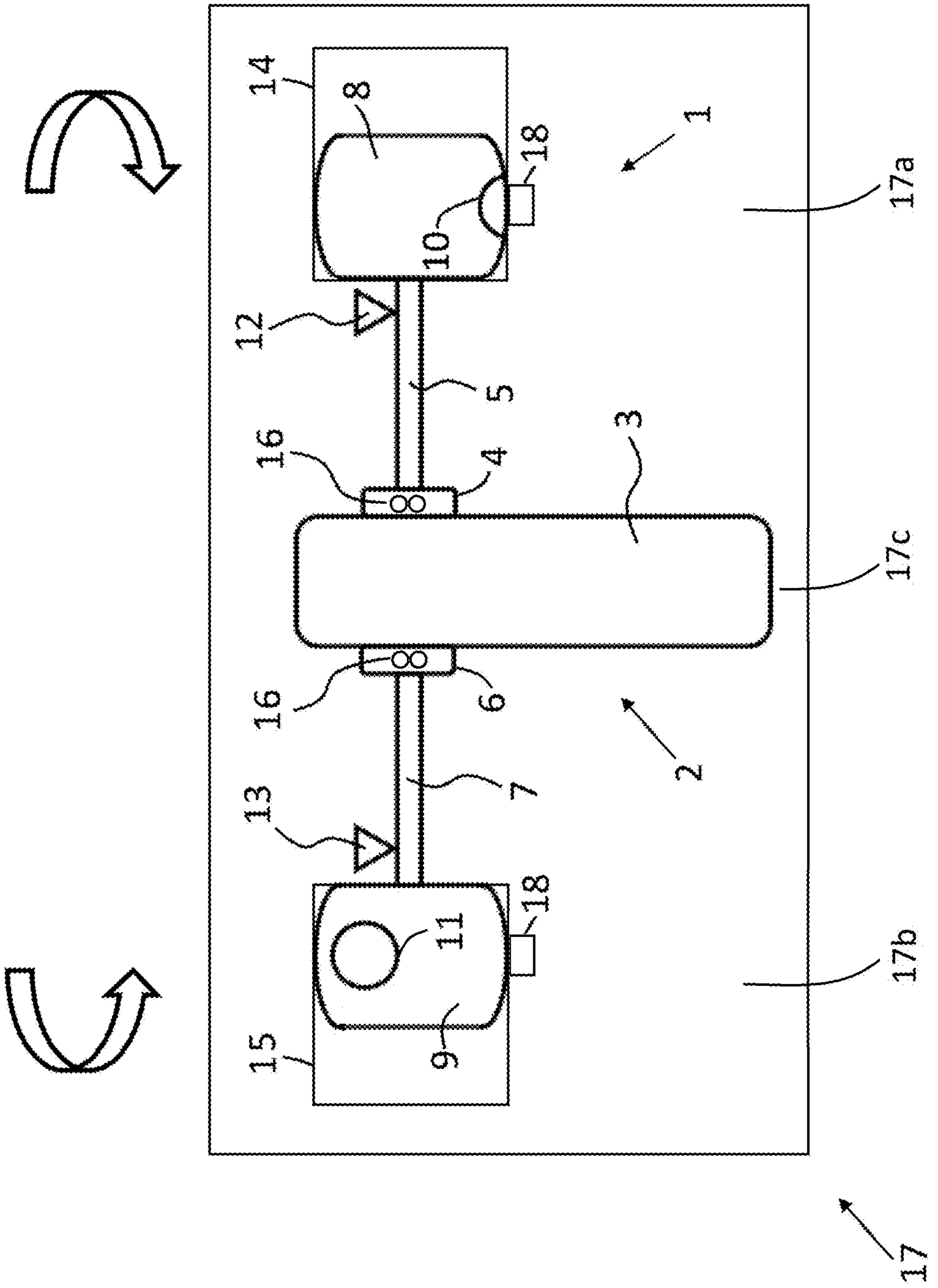
1
2
3
4
5
6
7
8
9
10
11
12
13
14
15
16
16
17
17a
17b
17c
18
18

VALVE DEVICE

RELATED APPLICATIONS

This patent claims priority to German Patent Application No. 10 2022 117 525.1, filed Jul. 13, 2022, and claims priority to German Patent Application No. 10 2023 115 758.2, filed Jun. 16, 2023. The entireties of German Patent Application No. 10 2022 117 525.1 and German Patent Application No. 10 2023 115 758.2 are incorporated herein by reference.

TECHNICAL FIELD

The present disclosure relates to a valve device for controlling the flow of fluids in at least two temperature control circuits and a temperature control circuit apparatus with such a compensating tank apparatus.

BACKGROUND

A valve is a component for shutting off or controlling the flow of fluids (liquids or gases).

In valves, a closure part (e.g., plate, cone, ball, or needle) is usually moved approximately parallel to the direction of flow or about an axis of rotation transverse to the direction of flow of the fluid. The flow is interrupted in that the closure part is pressed with the sealing surface to a suitably shaped opening, the valve or sealing seat.

In addition to shutting off material flows, valves are well-suited for control tasks.

A compensating tank is a fitting that is used in small and large systems, in particular in motor vehicles having internal combustion engines. It is needed in order to compensate for the loss of a liquid or gaseous operating device due to its temperature-related expansion, evaporation, or vaporization; in the case of temperature expansion, the fluctuating volume is compensated. Usually, the system pressure is maintained by means of the compensating tank and the provided operating device.

Actors, also known as actuators, usually refer to drive-technical components, which, for example, convert an electrical signal (commands issued by a control computer) into mechanical movements or changes in physical quantities, such as pressure or temperature, and thereby actively intervene in the controlled process.

DE 10 2020 207 303 A1 describes a coolant flow control module in which at least one first and a second closure body (rotor) of a ball valve are provided, wherein the first closure body is directly connected to an actuator in order to set the first closure body in a rotational motion. The first closure body is coupled to or engages with the second closure body such that the first closure body and the second closure body move in alignment with one another. According to a further exemplary embodiment, it is provided that a motion of the two closure bodies can contain an idle stroke feature, such that the first closure body can rotate with respect to the second closure body and, optionally, with respect to a third closure body. The idle stroke feature is intended to enable a relative motion between the closure bodies in order to enable additional flow designs.

A multi-space heat management valve module is disclosed in DE 11 2014 003 423 T5. This valve module is configured as a ball valve and comprises two closure bodies, wherein the two closure bodies are connected directly to a respective actuator. The closure body or the second valve body comprises a support strut, which extends from the valve body wall to a central region for engagement with the retaining feature or a retaining feature on the actuator shaft. According to this ball valve apparatus, both valve bodies and closure bodies are directly connected to the actuator.

DE 10 2018 009 680 A1 describes a mass flow control unit as well as a cooling system having at least one such mass flow control unit.

DE 10 2015 015 198 A1 provides a cooling device for a motor vehicle. It comprises a first low-temperature circuit, through which a cooling medium can flow with a first temperature, and a second high-temperature circuit, through which a cooling medium can flow with a second temperature that is higher than the first temperature, wherein a common compensating tank is provided on the circuits, which comprises a receiving space, which is subdivided by at least one separating device into a first space that is fluidly connected to the high-temperature circuit and a second space that is fluidly connected to the low-temperature circuit. In addition, a common insertion nozzle is provided for filling the cooling device. A cooling device for a motor vehicle is disclosed in DE 10 2017 006 079 A1.

Mass flow control units for controlling mass flows, in particular in cooling systems, are known in the prior art. For example, DE 10 2015 201 246 A1 discloses such a control device for controlling the coolant flows of a split-cooling system of an internal combustion engine having a housing with at least two inputs and three outputs. Rotatably mounted in the housing and rotatably provided between a plurality of control positions is a rotary body comprising at least one opening arranged at the circumferential side and/or through the circumferential side. The outputs are arranged with different orientations around the rotary body. The rotary body is arranged in a sealing manner within a space of the housing such that a flow of coolant entering the housing can at least partially exit through one of the outputs or is blocked from exiting the rotary body as a function of its respective control position. The outputs are arranged in a common plane around the longitudinal axis of the rotary body. The rotary body is configured so as to guide coolant flows entering through the inputs together in the associated control position to only one of the outputs and to simultaneously lock the other output. The two chambers of the housing each have a ball shape, wherein both chambers merge into one another, and the rotating body is arranged in these chambers. The rotary body is configured as a hollow body, whose wall comprises a plurality of openings in the form of through-openings. The mass flow control unit according to this prior art is quite expensively constructed and does not allow for any cost-efficient, application-specific changes.

The same applies to the prior art according to DE 10 2013 109 365 A1, according to which a thermostat valve for an internal combustion engine is disclosed, which comprises a housing having a plurality of cooling liquid connectors and at least two hollow valve elements arranged next to one other and mounted rotatably in the housing about a common axis of rotation. The valve elements each have at least one opening formed in the region of their lateral surface, wherein the openings can be optionally connected to one or more cooling liquid connectors of the housing by rotating the valve elements. Further, propulsion means are provided for rotating a first of the at least two valve elements between two end positions, wherein a second of the at least two valve elements can be optionally engaged with the first valve element and disengaged from the first valve. The second valve element is also rotationally driven in the state of being engaged with the first valve element by a rotation of the first valve element. Further, coupling means are provided, which are activated by rotating the first valve element to the first end position such that a coupling of the second valve element to the first valve element occurs, and which are activated by rotating the first valve element to the second end position such that a decoupling of the second valve element from the first valve element occurs.

EP 3 306 151 A1 furthermore discloses a valve arrangement comprising a valve body with a valve space and a plurality of connectors in the valve space. The plurality of connectors comprises a first connector, a second connector, and a third connector. The first and second connectors are aligned along a common axis and are arranged on opposite sides of the valve space. The system further comprises a valve element arranged within the valve space. The valve element is a rotatable ball having a passage opening extending through the ball and contains an opening at the end of the ball. The passage opening is substantially oval-shaped when viewed from the opening in a direction parallel to the passage opening. The valve element further comprises a valve shaft coupled to the valve element and a first end extending away from the valve body. Even in this prior art, which is constructed in a rather complex manner, no application-specific, cost-effective changes are possible.

A mass flow control unit is disclosed in DE 10 2018 009 680 A9, which is modular in design, wherein at least two housing parts are provided, wherein a respective housing part comprises at least one housing connection element for connecting to at least one further housing part, and wherein the valve element comprises a cylindrical body, which is provided with connection sections at its two ends that are opposite one another in the longitudinal direction for engaging with the servo drive and/or with at least one further valve element.

DE10 2020 123 912A1 discloses a valve apparatus for controlling the flow of fluids in two temperature control circuits. This apparatus comprises an actuator, a valve housing with a first receiving space and a second receiving space, a direct ball valve having the first receiving space with at least one first and a second fluid connector, wherein a first ball device with a first passageway is rotatably mounted in the first receiving space, wherein the first ball device is coupled to the actuator and can be directly activated by the actuator, and an indirect ball valve having the second receiving space with at least one third and a fourth fluid connector, wherein in the second receiving space a second ball device with a second passageway is rotatably mounted, wherein the second ball device is coupled to the first ball device and can thus be activated by the direct ball valve and indirectly activated by the actuator.

A ratchet is a designation for a bolting tool that, unlike an ordinary wrench, does not have to be re-applied again and again if too little space is available to perform a full revolution with the wrench attached. To tighten or loosen a bolted connection incrementally, the ratchet is instead repeatedly moved back and forth at a particular angle. The ratchet transfers the manual force in the one direction of rotation directly to the nut or screw. By contrast, in the opposite direction of rotation, no force is transmitted, but the ratchet rotates idly, simultaneously producing a mechanical creaking or ratcheting sound. In order for the tool to be suitable for both screwing and unscrewing, this function can be switched with a small lever or rotating ring on the ratchet head, so that the respective rotation directions for (creaking) idling and (silent) transmission of force are switched.

Depending on the fineness of the serration on which the ratchet runs, a working angle of 10 to 15 degrees is required in order to achieve a further rotation of the drive around a detent. In the case of fine-gauge ratchets, a rotational angle of about 5 degrees is already sufficient, which can also be used in tight conditions. Freewheel ratchets can get along entirely without a detent.

The reversal of the direction of rotation is achieved in a variety of ways:

A combination of two spring-loaded pawls facing in the opposite direction. Only one pawl is used at a time, while the other one does not abut the toothed ring. By shifting a lever or rotating a wheel, a switch is made from the one to the other pawl.

Instead of the pawl, a spring-loaded, ratcheted rocker is also used, which abuts the toothed ring on either one side or the other.

Through-hole ratchets with a continuous square hole can get along with a single pawl. The direction of rotation is changed by re-plugging the tool bit or square butt onto the other side of the ratchet.

SUMMARY

The problem addressed by the present disclosure is to provide a compact and simply constructed valve apparatus for controlling the flow of fluids, in particular in two temperature control circuits.

A further problem addressed by the present disclosure is to provide a compact and simply constructed valve apparatus.

In addition, a problem addressed by the present disclosure is to provide a valve apparatus that is an alternative to known valve apparatuses.

One or more of these problems are solved by the features of the independent claims 1 and 9. Advantageous configurations are specified in the respective dependent subclaims.

According to the present disclosure, a valve apparatus is provided for controlling the flow of fluids, in particular in at least two temperature control circuits. It comprises an actuator device having a first and a second transmission/coupling device, preferably with a first and a second freewheel, and a servo drive, a first and a second closure body of a first and a second valve, wherein the first closure body is connected to the servo drive via the first transmission/coupling device, and the second closure body is connected to the servo drive via the second transmission/coupling device, and wherein the first transmission/coupling device and the second transmission/coupling device are configured in such a way that, upon rotation of the servo drive in a first direction, the first closure body is rotated by the servo drive while the second closure body is not rotated by the servo drive, and preferably wherein, upon rotation of the servo drive, the second closure body is rotated by the servo drive in a second direction opposite the first direction, while the second closure body is not rotated by the servo drive.

According to a first embodiment, the valve apparatus for controlling the flow of fluids can also comprise: the actuator device having a first and a second transmission/coupling device and the servo drive, a first output shaft, which is connected to and can be activated by the servo drive of the actuator device via the first transmission/coupling device, a second output shaft, which is connected to and can be activated by the servo drive of the actuator device via the second transmission/coupling device, and the first and second closure bodies, for example a first and a second ball device, of a first and a second valve, for example a ball valve, wherein the first closure body is connected to the first output shaft, and the second closure body is connected to the second output shaft, and wherein the first transmission/ coupling device and the second transmission/coupling device are configured such that, depending on the direction of rotation of the servo drive, the first transmission/coupling device or the second transmission/coupling device engage and disengage with the first or the second output shaft so that the first or the second closure body can be set in a rotational motion.

According to a second exemplary embodiment of the present disclosure, the valve apparatus can also comprise the following for controlling the flow of fluids:

the actuator device having a servo drive, an output shaft which is connected to and can be activated by the servo drive of the actuator device, the first closure body, for example a ball device of a first valve, for example a ball valve, wherein the first closure body is connected to the output shaft via the first transmission/coupling device, the second closure body, for example a ball device of a second valve, e.g., a ball valve, wherein the second closure body is connected to the output shaft via the second transmission/coupling device, and wherein the first transmission/coupling device and the second transmission/coupling device are configured such that, depending on the direction of rotation of the servo drive, the first transmission/coupling device or the second transmission/coupling device engage and disengage with the first or the second closure body so that the first or the second closure body can be set in a rotational motion.

In the context of the present disclosure, the valves can be configured as any valve that can be activated by rotation, e.g., as a ball valve. As a closure body or closure portion, closure elements such as plates, cones, balls, discs, or needles can be provided.

Cooling circuits in motor vehicles are becoming increasingly complex. In most cases, more than one valve is used. Usually, each valve has its own actuator, which adversely affects vehicle integration, system complexity, and cost.

However, the valve apparatus according to aspects of this disclosure comprises only a single actuator device with a servo drive for activating two valves. The valve apparatus according to the disclosure is thus significantly more compactly designed and can, for example, be integrated into a housing device of the valve apparatus or into a compensating tank device, in particular of a motor vehicle.

With the valve apparatus according to the disclosure, the number of components is reduced compared to known apparatuses. This allows the valve apparatus to be integrated in a more space-saving manner and is also more simply constructed so that manufacturing costs are reduced.

In addition, by omitting a second actuator, an electrical consumption is eliminated.

Accordingly, the valve apparatus according to the disclosure requires less energy, less material, a smaller design space, and a smaller number of components.

In the context of the present disclosure, if the gear ratio from the servo drive to the output shaft(s) is not to be changed, the transmission/coupling device can only take on the technical function of a coupling. However, in the context of the present disclosure, it is usually provided that the transmission/coupling device will allow for both a change in the gear ratio and an engagement and disengagement of the output shaft(s).

Depending on the direction of rotation of the servo drive, the first transmission/coupling device and the second transmission/coupling device can alternately engage and disengage with the output shaft(s) such that the first closure body can be set, e.g., in a clockwise rotational motion or the second closure body can be set, e.g., in a counterclockwise rotational motion, or vice versa.

This means that, for example, a first valve can only be activated counterclockwise upon rotation and a second valve can only be activated counterclockwise upon rotation of the servo drive.

The transmission/coupling devices comprise a coupling, such as a jaw coupling, and gearwheel mechanisms (one or more gear stages with step down or step up) that engage and disengage with the output shaft(s) depending on the direction of rotation of the servo drive. For example, a first valve can only be activated upon clockwise rotation and a second valve can only be activated upon counterclockwise rotation.

A gear ratio of the first and/or second transmission/coupling device can be configured as a step down, such that the servo drive has a higher rotational speed than the (respective) output shaft and the associated first or second closure body, in particular when the first and/or the second closure body are a component of a proportional valve apparatus.

A gear ratio of the first and/or second transmission/coupling device can be configured as a step up, such that the servo drive has a lower rotational speed than the respective output shaft and the associated first or second closure body, in particular when the first and/or the second closure body are a component of a pilot valve apparatus.

This means that, with different gear ratios on the first or the second transmission/coupling device, it is possible to adapt the adjustment speed of the first and the second closure bodies of a first and a second valve according to the respective function of the valve.

A high adjustment speed, which is associated with a low adjustment accuracy, is particularly suitable for pilot valves.

A low adjustment speed, which is associated with a high adjustment accuracy, is therefore particularly suitable for proportional valves.

If the servo drive moves at a higher speed than a closure body, a step-down gear ratio is present. If the servo drive moves at a lower speed than a closure body, a step-up gear ratio is present.

The closure bodies can be activated independently of one another, because the direction of rotation of the output shaft(s) is changeable clockwise and counterclockwise, such that either only the first or only the second closure body can be activated via the first or the second transmission/coupling device.

Thus, according to aspects of the present disclosure, a novel drive is provided that allows two valve apparatuses, in particular two ball valves, to be operated independently but not simultaneously, because the direction of rotation of the output shaft(s) (clockwise and counterclockwise) is changed.

The first and/or the second and preferably both transmission/coupling devices can be configured in a ratchet-like manner, so that corresponding gearwheel mechanisms or gear stages can be engaged and disengaged with the output shaft(s) by means of a type of claw coupling, depending on the direction of rotation of the servo drive.

The technical configuration of a ratchet is briefly explained in the introduction to the present disclosure. Such a configuration of the transmission/coupling device allows for a simple and low-maintenance mechanical construction of the valve apparatus, which is also safe and reliable in operation.

The first and/or the second closure body and/or the first and/or the second output shaft can comprise a position sensor for detecting a valve position and/or an adjustment speed of the first and/or the second closure body.

The position sensors are preferably arranged on the valve or on the closure body itself. Functional safety is thus monitored to the greatest extent possible. Otherwise, the shaft could break in the region between the sensor and the valve, so that the actuator receives a correct sensor signal, but the valve itself no longer rotates.

As a result of the technical structure of a valve apparatus according to aspects of this disclosure shown above, the respective closure bodies can only be moved in one direction of rotation. A resetting of the respective closure body is not provided with this apparatus and is also not possible. Accordingly, a corresponding closure body must always be rotated further in order to return to the home position.

The valve apparatus can comprise a housing device having a first receiving space, a second receiving space, and an actuator receiving space, wherein a first valve is provided comprising the first receiving space and the first closure body rotatably supported therein with at least one first passageway and at least one fluid connector, and wherein a second valve is provided comprising the second receiving space and the second closure body rotatably supported therein with at least one second passageway and at least one further fluid connector, wherein the actuator device is arranged in the actuator receiving space of the housing device of the valve apparatus and is thus an integral component of the valve apparatus or also of a compensating tank apparatus of a motor vehicle.

Thus, the valve apparatus according to aspects of this disclosure, in particular the actuator device, can be arranged together with the first and the second closure bodies in a single housing. This results in a very compact and efficient design, which requires a low design space and is thus easier to integrate into a vehicle.

Furthermore, according to aspects of the present disclosure, a method for activating two valves of a valve apparatus discussed above is provided, in particular for controlling the flow of fluids in at least two temperature control circuits. This method comprises the following steps:

- activating a servo drive in a first direction of rotation, wherein the servo drive is connected to a first closure body via a first transmission/coupling device,
- setting the first closure body in a first rotational motion, in particular clockwise, wherein a second closure body is separated from the servo drive via a second transmission/coupling device and is stationary,
- activating the first closure body of a first valve,
- activating the servo drive in a second direction of rotation, wherein the servo drive is connected to the second closure body via a second transmission/coupling device,
- setting the second closure body in a second rotational motion, in particular in a counterclockwise direction, wherein the first closure body is separated from the servo drive via the first transmission/coupling device and is thus stationary, and
- actuating a second closure body of a second valve.

According to the first exemplary embodiment, the method comprises, by way of example, the following steps:

- actuating a servo drive of an actuator device in a first direction of rotation, wherein the servo drive is connected to a first output shaft via a first transmission/coupling device,
- setting the first output shaft in a first rotational motion, in particular in a clockwise direction, wherein a second output shaft is separated from the servo drive via a second transmission/coupling device and is stationary,
- activating a first closure body, for example a ball device, of a first valve, for example a ball valve,
- activating the servo drive in a second direction of rotation, wherein the servo drive is connected to the second output shaft via a second transmission/coupling device,
- setting the second output shaft in a second rotational motion, in particular in a counterclockwise direction, wherein the first output shaft is separated from the servo drive via a first transmission/coupling device and is thus stationary,
- activating a second closure body, for example a ball device, of a second valve, for example a ball valve.

A method according to the second exemplary embodiment also comprises substantially the steps described above, wherein only a single output shaft is provided.

The advantages of the method according to the disclosure correspond analogously to the advantages described above with respect to the valve apparatus.

The first and the second transmission/coupling device can have different gear ratios, such that the first closure body moves at a different rotational speed than the second closure body, wherein a respective position sensor can be provided in particular in order to determine a valve position of the first and the second closure bodies and increase the adjustment accuracy.

BRIEF DESCRIPTION OF THE DRAWINGS

The present disclosure will now be described in greater detail on the basis of a first exemplary embodiment shown in the FIGURE. The FIGURES show:

FIG. 1 is a schematic view of a valve apparatus according to aspects of this disclosure.

DETAILED DESCRIPTION

A valve apparatus 1 according to aspects of this disclosure, according to a first exemplary embodiment, comprises an actuator device 2 (FIG. 1).

The actuator device 2 comprises a servo drive 3, which can be connected to a first output shaft 5 via a first transmission/coupling device 4. The servo drive 3 can also be connected to a second output shaft 7 via a second transmission/coupling device 6.

The first output shaft 5 is connected to a first closure body or a first ball device 8 of a first valve or a first ball valve 14.

The second output shaft 7 is connected to a second closure body or a second ball device 9 of a second valve or a second ball valve 15.

The first and second ball device 8, 9 each comprise a respective first and second passageway 10, 11.

The valve apparatus 1 comprises a housing device 17 in which the technical features or the components of the valve apparatus 1 mentioned above are arranged and accommodated.

The housing device comprises a first receiving space 17*a*, a second receiving space 17*b*, and an actuator receiving space 17*c*.

The valve apparatus 1 thus comprises a first ball valve 14, which comprises the first receiving space, the first ball device 8 rotatably supported therein, and at least the first passageway 10 and a fluid connector 18.

The valve apparatus 1 also comprises a second ball valve 15, which comprises the second receiving space, the second ball device 9 rotatably supported therein, at least the second passageway 11, and at least one further fluid connector 18.

The actuator device 2 is arranged in the actuator receiving space of the housing device of the valve apparatus 1 and is thus an integral component of the valve apparatus.

The housing device of the valve apparatus 1 can also use parts of a compensating tank apparatus or can be an integral component of a compensating tank apparatus.

In the present exemplary embodiment, a first position sensor 12 is arranged on the first output shaft 5 and a second position sensor 13 is arranged on the second output shaft 7.

Alternatively, the position sensors 12, 13 can be arranged on the first and second closures respectively, i.e., on the first ball device 8 and on the second ball device 9, in order to detect a valve position and/or a speed of adjustment of the first and/or the second ball device 8, 9.

The position sensors 12, 13 are preferably arranged on the inside of the valve or the closure body itself. Functional safety is thus monitored to the greatest extent possible.

Depending on the direction of rotation of the servo drive 3, the first transmission/coupling device 4 engages with the first output shaft 5 so that the first ball device is moved clockwise in a rotational motion.

By reversing the direction of rotation of the servo drive, the second transmission/coupling device 6 engages with the second output shaft 7 so that the second ball device is set in a counterclockwise rotational motion.

The first ball device can be configured as a pilot valve. In such a case, the first transmission/coupling device 4 is configured with a gear ratio such that the first output shaft 5 rotates at a higher speed than the servo drive 3. In this way, a high adjustment speed is enabled, wherein a corresponding adjustment accuracy is thereby reduced. However, this plays a minor role in pilot valves.

The second ball device 9 can be configured as a proportional valve or a proportional control valve. Then, the second transmission/coupling device 6 has a step-down gear ratio such that the servo drive 3 rotates at a higher speed than the second output shaft 7. In this way, a high adjustment accuracy is achieved, wherein only a lower adjustment speed is possible.

In the context of the present disclosure, both transmission/coupling units 4, 6 can also have an identical or similar step-down or step-up gear ratio.

The first and the second ball device of a respective first or second ball check valve can be configured as any desired valve, for example, pilot valves or proportional control valves.

According to the disclosure, it is thus provided that the ball devices 8, 9 can be activated only independently of one another. This means that only one ball device 8, 9 is connected to the servo drive 3 of the actuator device 2 at a time via the respective first transmission/coupling device 4 or the second transmission/coupling device 6.

The direction of rotation of the output shafts 5, 7 is either in the clockwise direction or counterclockwise direction, such that either only the first or only the second ball device can be activated via the first or the second transmission/coupling device. The transmission/coupling devices 4, 6 are configured in a ratchet-like manner, so that corresponding gearwheel mechanisms can be engaged and disengaged with the output shafts by means of a type of claw coupling, depending on the direction of rotation of the servo drive. Alternatively, a different suitable device for rotationally independent control can also be used, e.g., with gearwheels and pawls.

According to an alternative second embodiment (not shown) it is provided that the servo drive is directly connected to a single output shaft. Unless otherwise described, the valve apparatus according to the second exemplary embodiment of this disclosure has the same technical features as the valve apparatus according to the first exemplary embodiment.

The first and the second ball device each comprise a first and a second transmission/coupling device via which the first ball device and the second ball device are directly connected to the output shaft.

Such a configuration has the same technical effect and functionality as the valve apparatus 1 according to the disclosure as described above.

In the following, a method according to the disclosure for operating two ball valves of a valve apparatus 1 according to the first exemplary embodiment is described. The method comprises the following steps:

- activating a servo drive of an actuator device in a first direction of rotation, wherein the servo drive is connected to a first output shaft via a first transmission/coupling device,
- setting the first output shaft in a first rotational motion, in particular in a clockwise direction, wherein a second output shaft is separated from the servo drive via a second transmission/coupling device and is stationary,
- activating a first ball device of a first ball valve,
- activating the servo drive in a second direction of rotation, wherein the servo drive is connected to the second output shaft via a second transmission/coupling device,
- setting the second output shaft in a second rotational motion, in particular in a counterclockwise direction, wherein the first output shaft is separated from the servo drive via a first transmission/coupling device and is thus stationary,
- activating a second ball device of a second ball valve.

The first and second transmission/coupling device have different gear ratios, so that the first ball device moves at a different rotational speed than the second ball device.

A position sensor is arranged on the output shaft(s) in order to determine a valve position of the first and the second ball device, respectively.

A compensating tank apparatus can be configured according to a compensating tank apparatus disclosed in the as yet unpublished European Patent Application EP 2017 4528.8.

Furthermore, according to the present disclosure, a temperature control circuit apparatus can be provided (not shown) comprising the valve apparatus 1 described above.

Furthermore, the temperature control circuit apparatus can comprise a first temperature control circuit (not shown), wherein the first temperature control circuit is connected to at least [two] fluid connectors of the first ball valve. In addition, a second temperature control circuit (not shown) is provided, which is connected to at least two fluid connectors of the second ball valve.

The first temperature control circuit can be configured as a high-temperature control circuit and/or a small circuit having a predetermined total volume, and the second temperature control circuit can be configured as a low-temperature control circuit and/or a large circuit having a predetermined total volume, wherein its total volume is greater than the total volume of the first temperature control circuit. The corresponding arrangement can also be provided inversely, such that the first temperature control circuit is configured as a low-temperature control circuit and/or a large circuit, and the second temperature control circuit is configured as a high-temperature control circuit and/or a small circuit.

Preferably, the compensating tank apparatus according to the disclosure is provided with a valve apparatus 1 for liquids, in particular for cooling circuits in motor vehicles.

Accordingly, the low-temperature control circuit can be a cooling circuit for an intercooler and/or a battery. The high-temperature control circuit can preferably be a cooling circuit for an internal combustion engine. The cooling circuits can also be configured for electric vehicles.

LIST OF REFERENCE NUMERALS

1 Valve apparatus
2 Actuator device
3 Servo drive
4 First transmission/coupling device
5 First output shaft
6 Second transmission/coupling device
7 Second output shaft
8 First ball device
9 Second ball device
10 First passageway
11 Second passageway
12 First position sensor
13 Second position sensor

What is claimed is:

1. A valve device for controlling fluid flow in at least two temperature control circuits, the valve device comprising:
a pilot valve apparatus,
an actuator device having a first transmission/coupling device, a second transmission/coupling device, and a servo drive,
a first closure body of a first valve and a second closure body of a second valve,
wherein the first closure body is a ball device, and wherein the second closure body is a ball device,
wherein at least one of the first closure body or the second closure body is a component of the pilot valve apparatus,
wherein the first closure body is connected to the servo drive via the first transmission/coupling device, and the second closure body is connected to the servo drive via the second transmission/coupling device, and
wherein the first transmission/coupling device and the second transmission/coupling device each comprise a ratchet mechanism including a pawl and a ratchet wheel, and are configured such that, upon rotation of the servo drive in a first direction, the pawl of the first transmission/coupling device engages the ratchet wheel of the first transmission/coupling device to rotate the first closure body, while the pawl of the second transmission/coupling device disengages from the ratchet wheel of the second transmission/coupling device such that the second closure body is not rotated by the servo drive.

2. The valve device according to claim 1, wherein:
a first output shaft is connected to, and activated by, the servo drive of the actuator device via the first transmission/coupling device, and a second output shaft is connected to, and activated by, the servo drive of the actuator device via the second transmission/coupling device,
wherein the first transmission/coupling device or the second transmission/coupling device is configured to engage and disengage with the first output shaft or the second output shaft via the pawl such that the first closure body or the second closure body is set in a rotational motion.

3. The valve device according to claim 1, wherein a gear ratio of at least one of the first transmission/coupling device or the second transmission/coupling device is configured as a step-up gear ratio, such that a rotational speed of the servo drive is less than a rotational speed of an output shaft.

4. The valve device according to claim 1, wherein at least one of the first closure body, the second closure body, a first output shaft, or a second output shaft comprises a position sensor directly mounted thereon for detecting a valve position of at least one of the first closure body or the second closure body, wherein the position sensor is independent of the first transmission/coupling device and the second transmission/coupling device.

5. The valve device according to claim 1, wherein:
the pilot valve apparatus comprises a housing device having a first receiving space, a second receiving space, and an actuator receiving space, wherein the first valve is provided in the first receiving space and the first closure body is rotatably supported therein with at least one first passageway and at least one fluid connector, and wherein
the second valve is provided in the second receiving space and the second closure body is rotatably supported therein with at least one second passageway and at least one further fluid connector, wherein
the actuator device is arranged in the actuator receiving space of the housing device of the pilot valve apparatus and is thus an integral component of the pilot valve apparatus.

6. A valve device for controlling fluid flow in at least two temperature control circuits, the valve device comprising:
a pilot valve apparatus;
a housing device having a first receiving space, a second receiving space, and
an actuator receiving space; an actuator device comprising a first transmission/coupling device, a second transmission/coupling device, and a servo drive,
wherein the actuator device is arranged in the actuator receiving space of the housing device as an integral component;
a first closure body of a first valve rotatably supported in the first receiving space with at least one first passageway and at least one first fluid connector, wherein the first closure body is a ball device,
wherein the first closure body is connected to the servo drive via the first transmission/coupling device; and a second closure body of a second valve rotatably supported in the second receiving space with at least one second passageway and at least one second fluid connector, wherein the second closure body is a ball device,
wherein the second closure body is connected to the servo drive via the second transmission/coupling device, wherein the first transmission/coupling device and the second transmission/coupling device each comprise a ratchet device including a pawl and a ratchet wheel, and are configured such that, upon rotation of the servo drive in a first direction, the pawl of the first transmission/coupling device engages the ratchet wheel of the first transmission/coupling device to rotate the first closure body, while the pawl of the second transmission/coupling device disengages from the ratchet wheel of the second transmission/coupling device such that the second closure body is not rotated by the servo drive, and wherein at least one of the first closure body or the second closure body is a component of the pilot valve apparatus.

7. The valve device according to claim 6, wherein a first output shaft is connected to, and activated by, the servo drive of the actuator device via the first transmission/coupling device, and a second output shaft is connected to, and activated by, the servo drive of the actuator device via the second transmission/coupling device, and wherein the first transmission/coupling device or the second transmission/coupling device is configured to engage and disengage with the first output shaft or the second output shaft via the pawl such that the first closure body or the second closure body is set in a rotational motion.

8. The valve device according to claim 6, wherein an output shaft configured to be activated by the servo drive of the actuator device, wherein the first closure body is connected to the output shaft via the first transmission/coupling device, wherein the second closure body is connected to the output shaft via the second transmission/coupling device, and wherein the first transmission/coupling device and the second transmission/coupling device are configured such that, depending on the direction of rotation of the servo drive, the first transmission/coupling device or the second transmission/coupling device is configured to engage and disengage with the first or the second closure body so that the first or the second closure body is set in a rotational motion.

9. The valve device according to claim 8, wherein, depending on the direction of rotation of the servo drive, the first transmission/coupling device and the second transmission/coupling device are configured to engage and disengage with the output shaft such that the first closure body is set in a clockwise rotational motion or the second closure body is set in a counterclockwise rotational motion, or the first closure body is set in a counterclockwise rotational motion or the second closure body is set in a clockwise rotational motion.

10. The valve device according to claim 8, wherein at least one of the first closure body and the second closure body is a component of a proportional valve apparatus, and a gear ratio of at least one of the first transmission/coupling device or the second transmission/coupling device is configured as a step-down gear ratio, such that a rotational speed of the servo drive is greater than a rotational speed of the output shaft.

11. The valve device according to claim 6, wherein a gear ratio of at least one of the first transmission/coupling device or the second transmission/coupling device is configured as a step-up gear ratio, such that a rotational speed of the servo drive is less than a rotational speed of an output shaft.

12. The valve device according to claim 8, wherein the closure bodies are activated independently of one another, such that the direction of rotation of the output shaft is changeable clockwise and counterclockwise, such that either only the first closure body or only the second closure body is activated via the first or the second transmission/coupling device.

13. The valve device according to claim 6, wherein at least one of the first closure body, the second closure body, a first output shaft, or a second output shaft comprises a position sensor directly mounted thereon for detecting a valve position of at least one of the first closure body or the second closure body, wherein the position sensor is independent of the first transmission/coupling device and the second transmission/coupling device.

* * * * *